L. Hollaway,
Gang Plow,

Nº 46,903. Patented Mar. 21, 1865.

Witnesses
Henry Morris
Geo. W. Reed

Inventor
L. Hollaway

UNITED STATES PATENT OFFICE.

L. HOLLAWAY, OF GILROY, CALIFORNIA.

IMPROVEMENT IN GANG-PLOWS.

Specification forming part of Letters Patent No. 46,903, dated March 21, 1865.

*To all whom it may concern:*

Be it known that I, L. HOLLAWAY, of Gilroy, in the county of Santa Clara and State of California, have invented a new and Improved Gang-Plow; and I do hereby declare that the following is a full, clear, and exact description thereof, reference being had to the accompanying drawings, forming a part of this specification, in which—

Figure 1:
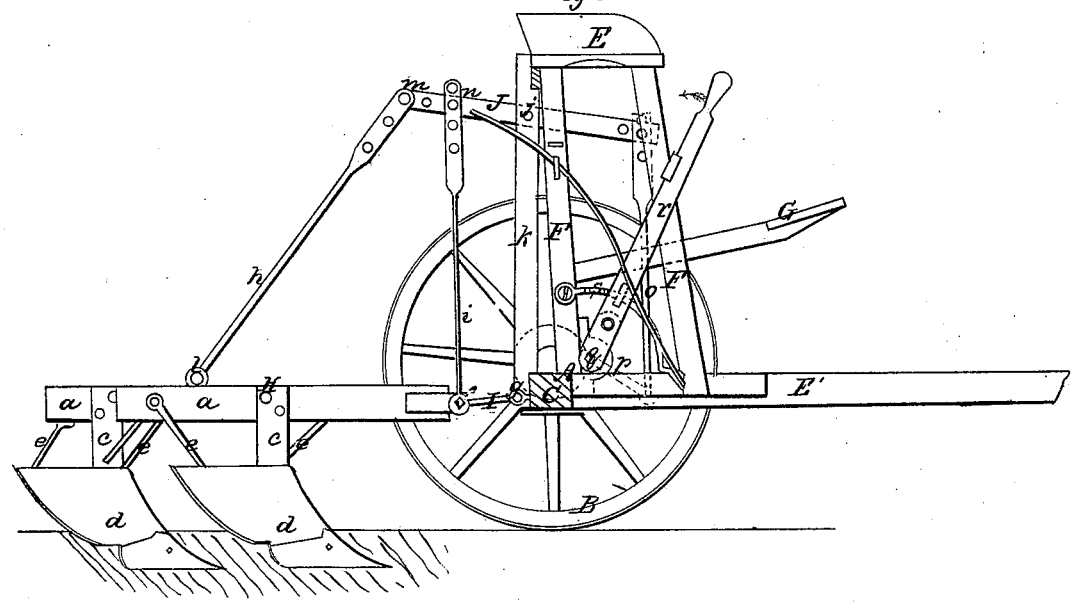
Figure 2:
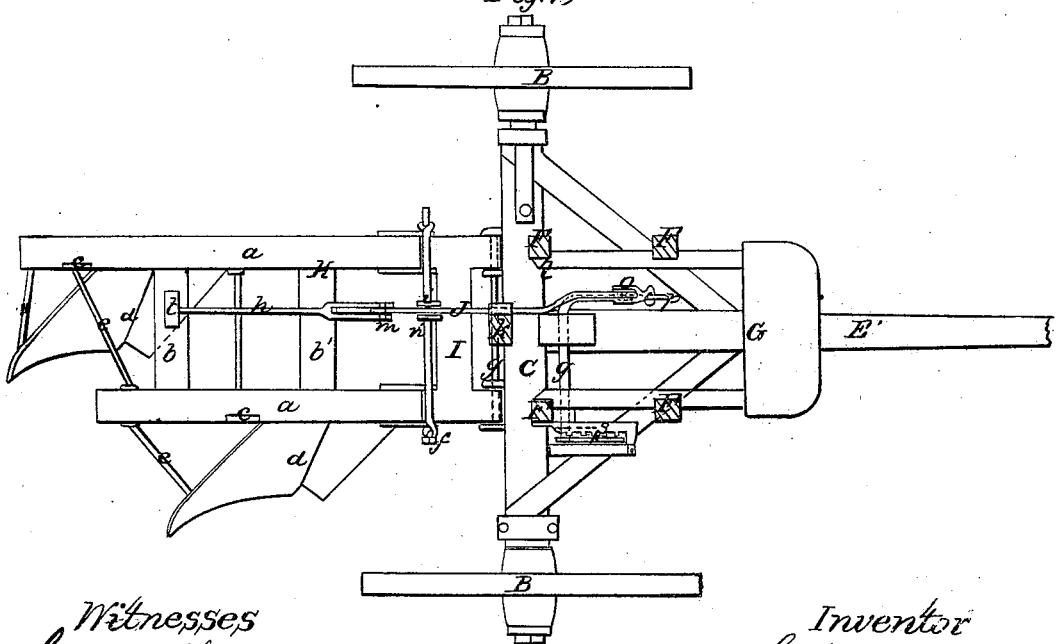

Figure 1 represents a longitudinal vertical section of my invention; Fig. 2, a horizontal section of the same.

Similar letters of reference in both views indicate corresponding parts.

This invention relates to an improvement in that class of gang-plows in which the plows are attached to a separate frame which connects by a hinge with a truck, so that by drawing the truck through a field the plows are caused to act on the soil to any desired depth.

The nature of my invention and its peculiar advantages will be readily understood from the following description.

A represents a truck composed of an axle, C, which rests in two wheels, B, and from which a draft-pole, E', extends, as clearly shown in the drawings. The wheels B B are either made of different size or they are connected to the axle C at different heights from the ground, to compensate for the difference in the level of the cultivated and uncultivated soil. E is the driver's seat, which is supported by standards F and provided with a footboard, G, as clearly shown in Fig. 1 of the drawings.

H is a frame composed of two longitudinal beams, $a$, which are united by cross-bars $b$ $b'$, and to which the standards $c$ of the plows $d$ are rigidly attached. These plows are made in the shape of single-shovel plows with landsides, or in any other desirable shape and manner, and they, together with their standards, are steadied by braces $e$.

The frame H connects with the axle C of the truck by means of a link, I, which forms a double joint, being attached to said frame by a hinge, $f$, and to the truck by a hinge, $g$, and two rods, $h$ $i$, connect the frame with a lever, J, which has its fulcrum on a pivot, $j$, in an upright, $k$, which rises from the axle C behind the driver's seat.

The rod H is connected by a hinge-joint, $l$, with the rear cross-bar, $b$, of the plow-frame H, and the rod $i$ connects with the rod which forms the fulcrum of the hinge $f$, and the upper ends of said rods are secured to the lever J by pivots $m$ $n$ at different distances from its fulcrum, and these distances are adjustable by several holes made in said lever, as clearly shown in Fig. 2 of the drawings. The front end of the lever J connects by an arm, $o$, with an arm, $p$, extending from a rock-shaft, $q$, which has its bearings in suitable boxes below the driver's seat, and to which a hand-lever, $r$, is firmly secured. This hand-lever extends upon the side of the driver's seat, so that it can be conveniently operated by the driver, and it is adjustable in a serrated or notched segment, $s$. By throwing the hand-lever $r$ in the direction of the arrow marked near it in Fig. 1 the plow-frame H is depressed, and by the peculiar relation of the link-joint I and rods $h$ $i$ toward each other and toward the frame H the plow-frame, in being raised, remains parallel, or nearly so, to its original position. Furthermore, by shifting the position of the pivots $m$ $n$, which form the connection of the rods $h$ $i$ with the lever J, either end of the plow-frame may be raised or depressed at pleasure and the plows can be brought to any desired inclination, according to the nature of the soil and to the depth to which it is to be penetrated. By this arrangement the driver has perfect control over the plows, he can adjust them as he thinks best, and during the operation he can instantaneously raise the plows out of the ground or adjust them higher or lower, as he deems necessary by the nature of the soil or by obstuctions which may occur in the same.

The entire plow is very simple in its construction, it is easily operated, and all its parts are so constructed that they are not liable to get out of order.

What I claim as new, and desire to secure by Letters Patent, is—

The link-joint I, in combination with the adjustable rods $h$ $i$, lever J, plow-frame H, and truck A, constructed and operating in the manner and for the purpose substantially as herein shown and described.

L. HOLLAWAY.

Witnesses:
  I. B. TULLY,
  JOHN M. KEITH.